United States Patent [19]
Burst

[11] Patent Number: 5,025,986
[45] Date of Patent: Jun. 25, 1991

[54] HEATING SYSTEM FOR A MOTOR VEHICLE WITH AN AIR-COOLED REAR ENGINE

[75] Inventor: Hermann Burst, Rutesheim, Fed. Rep. of Germany

[73] Assignee: Dr. Ing. h.c.F. Porsche AG, Fed. Rep. of Germany

[21] Appl. No.: 387,525

[22] Filed: Jul. 31, 1989

[30] Foreign Application Priority Data

Jul. 30, 1988 [DE] Fed. Rep. of Germany ....... 3826022

[51] Int. Cl.⁵ .................................................. B60H 1/02
[52] U.S. Cl. ................................ 237/12.3 A; 181/243
[58] Field of Search ................. 237/12.3 A, 12.3 R, 237/12.3 B; 98/DIG. 10; 181/211, 212, 243; 29/890.045, 890.031

[56] References Cited

U.S. PATENT DOCUMENTS 3,096,938 7/1963 Cole et al. .................... 237/12.3 A

FOREIGN PATENT DOCUMENTS 2930162 2/1981 Fed. Rep. of Germany .... 98/DIG. 10
1032130 6/1953 France ........................... 237/12.3 B

*Primary Examiner*—Henry A. Bennet
*Attorney, Agent, or Firm*—Evenson, Wands, Edwards, Lenahan & McKeown

[57] ABSTRACT

So that a heating pipe of a heating system which extends inside a body part can be mounted and demounted in an easy and low-cost manner, and a defective sound-absorbing device can be exchanged easily, the heating pipe with the integrated sound absorbing device is formed by a prefabricated flexible mounting part which, after the surface treatment of the motor vehicle, is inserted into the body part through a mounting opening provided in a front wheel house and, at the end face, is connected with adjacent components of the heating system and of the body.

12 Claims, 5 Drawing Sheets

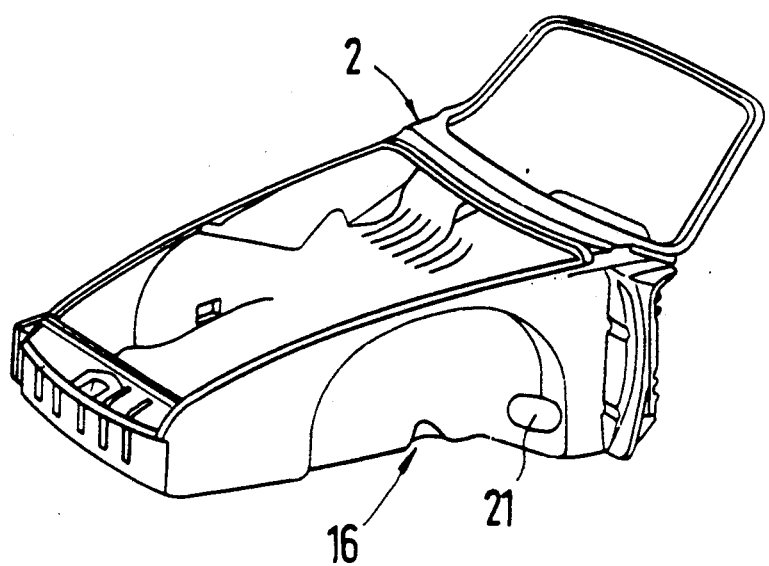
FIG.6
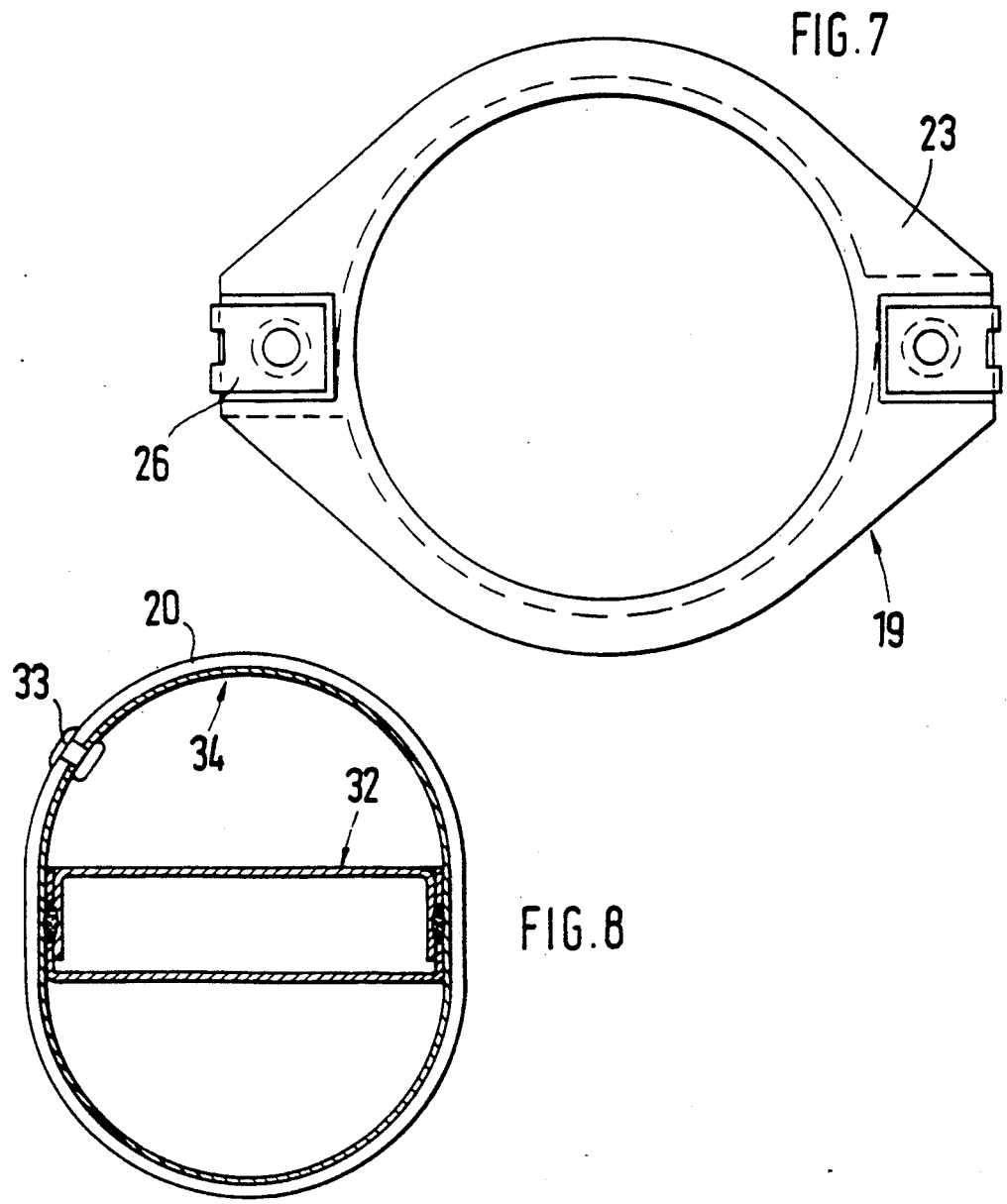
FIG.7
FIG.8

HEATING SYSTEM FOR A MOTOR VEHICLE WITH AN AIR-COOLED REAR ENGINE

BACKGROUND AND SUMMARY OF THE INVENTION

The invention relates to a heating system for a motor vehicle with an air-cooled rear engine of the type including a heating pipe of a heating line provided with a sound absorbing device extending inside body parts of the motor vehicle.

In a known heating system of the initially mentioned type disclosed in German Published Unexamined Patent Application (DE-OS) 16 30 919, the heating pipes equipped with sound absorbing devices are housed inside body parts (protuberances) of the motor vehicle and are fixedly connected with it, these body parts, together with the heating pipes, being subjected to a subsequent surface treatment. The heating pipes, which are made of steel tubing, are welded together with the body parts. So that no paint can enter the sound absorbing device for example, during dip painting, the inflow and outflow openings of the sound absorbing device are provided with inserted coverings which can be removed after the conclusion of the surface treatment. In practice, it was found that, despite these coverings, paint partly enters into the sound absorbing device which results in an annoying odor in the passenger space. In these cases, time-consuming and cost-consuming measures (such as a rinsing of the sound absorbing device) are required in order to eliminate this annoying odor. In addition, in the case of this arrangement, a defective sound absorbing device can be replaced only at high cost—removal of the outside plate of the protuberance.

It is an object of the invention to take such measures at the vehicle body and at the heating system that, on the one hand, a simple low-cost mounting of the heating pipe and an exchange of a defective sound absorbing device is ensured and that, on the other hand, an annoying odor from the sound absorbing device because of the surface treatment of the motor vehicle is avoided.

According to the invention, this object is achieved by providing an arrangement wherein the heating line with the integrated sound absorbing device is formed by a prefabricated flexible mounting part which, after the surface treatment of the motor vehicle, is inserted in the body part through a mounting opening provided in a front wheel house and at the end face is connected with adjacent components of the heating system and of the body.

Principal advantages achieved by means of especially preferred embodiments of the invention are that, as a result of the flexible construction of a prefabricated corrugated-tube-type mounting part consisting of a sound absorbing device, an elbow and a corrugated-tube hose, a simple and low-cost mounting and demounting of the heating pipe which extends inside a body part is achieved. A defective sound absorbing device can be exchanged easily and rapidly in this arrangement. As a result of the mounting of the heating pipe after the surface treatment, the paint cannot come in contact with the sound absorbing device and thus can also not cause any annoying odor. In certain preferred embodiments, the sound absorbing device is fixed in its installed position by means of spring clips introduced into the side member of the vehicle. The end connection piece arranged at the rear end of the corrugated-tube hose permits an easy suspending of the steel cable as well as a simple connection between the corrugated-tube hose and the rear transition piece.

Other objects, advantages and novel features of the present invention will become apparent from the following detailed description of the invention when considered in conjunction with the accompanying drawings.

BRIEF DESCRIPTION OF THE DRAWINGS

FIG. 6 is a partial schematic diagonal view from the front of the forward end of the motor vehicle of FIG. 1;

FIG. 7 is an enlarged view taken in the direction of arrow R of FIG. 2;

FIG. 8 is an enlarged sectional view taken along line VIII—VIII of FIG. 2.

DETAILED DESCRIPTION OF THE DRAWINGS

Figure 1:
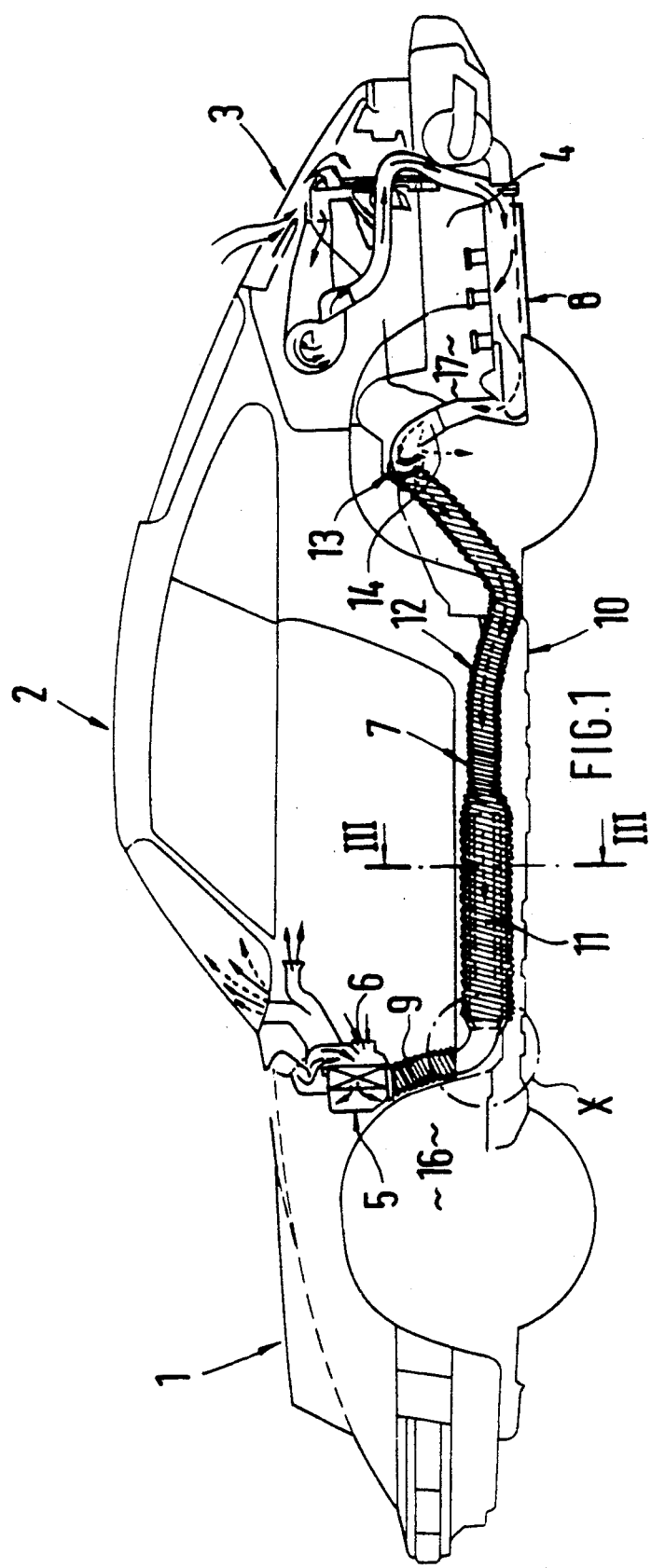
FIG. 1 is a lateral view of a motor vehicle with a heating system constructed in accordance with a preferred embodiment of the invention.

FIG. 1 shows a motor vehicle 1 (passenger car) with a body 2 and an air-cooled internal-combustion engine 4 arranged in the rear 3. A heating system 5 of the motor vehicle 1 comprises a heating and/or air-conditioning unit 6 arranged adjacent to a passenger space and connected to an exhaust heat exchanger 8 arranged adjacent to the internal-combustion engine 4 by means of a heating line 7.

Figure 2:
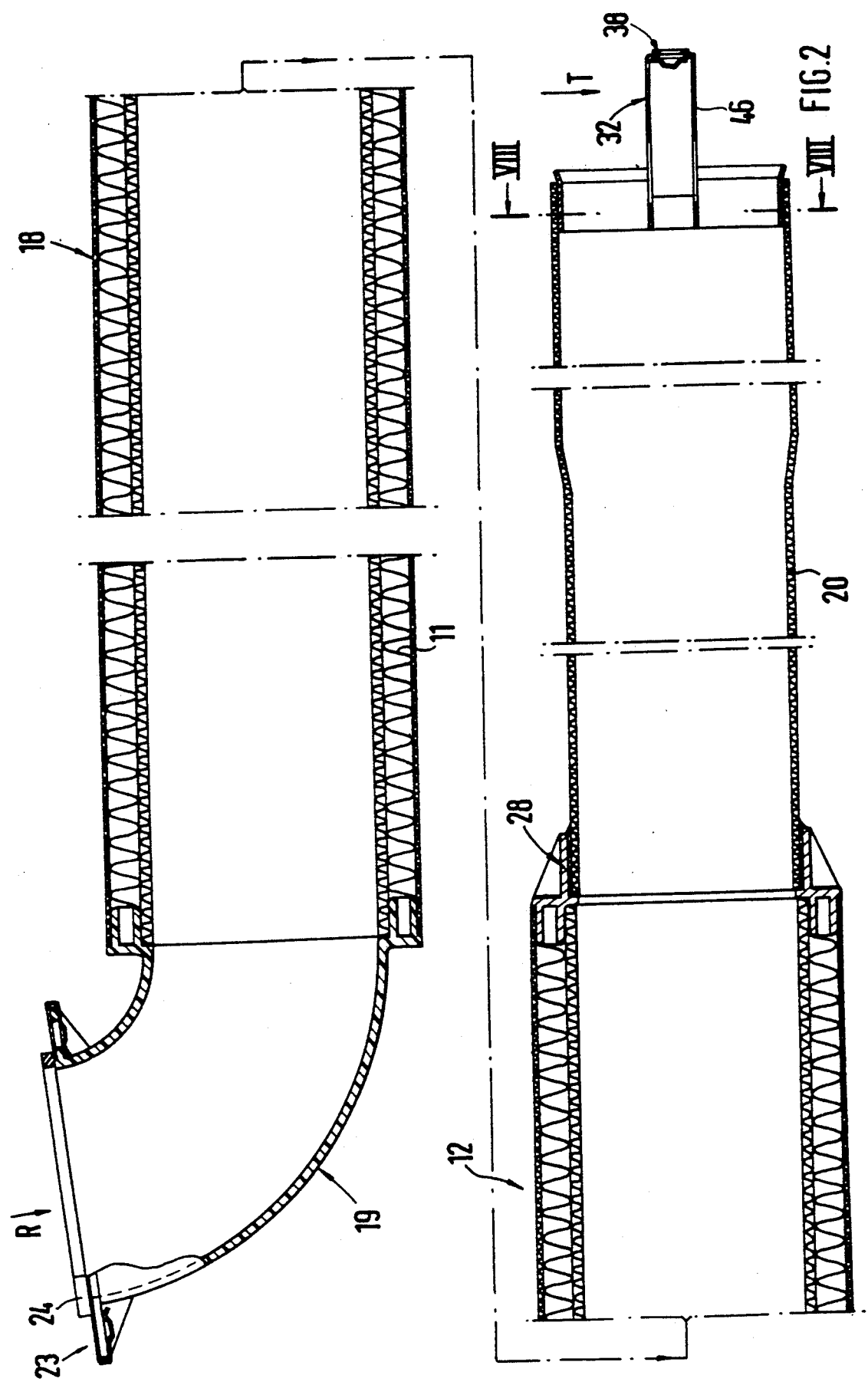
FIG. 2 is an enlarged longitudinal sectional view of the heating pipe of the heating system of FIG. 1, shown in the stretched-out position.

According to FIG. 1 and 2, the heating line 7 consists of a front connecting hose 9, a heating pipe 12 extending inside support-type body parts 10 and provided with a sound absorbing device 11, a flap box 13 arranged outside body part 10, and a rear connecting pipe 14. Corresponding to FIG. 3, the heating pipe 12 extends inside a laterally exterior vehicle side member 15 which extends approximately from a front wheel housing 16 to a rear wheel housing 17. In the front area, the vehicle side member 15 is formed by a protuberance and in the rear area by a support. Just in front of the rear wheel housing 17, the vehicle side member 15 is bent at right angles toward the inside and upwards.

According to the invention, the heating pipe 12 housed inside the vehicle side member 15 is formed by a prefabricated flexible mounting part 18 which consists of a front elbow 19, the sound absorbing device 11 constructed in the manner of a corrugated tube and a connecting corrugated-tube hose 20 (FIG. 2). After the surface treatment of the motor vehicle (body shell), this mounting part 18 is pulled through a mounting opening 21 (FIG. 6) provided in the front wheel house 16 from the front toward the rear through body part 10 and subsequently, at both ends, is connected with adjacent components of the heating system 5 and with the body 2. The front elbow 19 connects the approximately horizontally aligned sound absorbing device 11 with an upper boundary wall 22 of the vehicle side member 15.

The elbow 19, which is heat-resistant up to approximately 150° C., is made of plastic and, by means of gluing, is connected with the front end of the sound absorbing device 11. An end-face contact flange 23 of the elbow 19, with the interposition of a sealing device 14, extends from below to the upper boundary wall 22 of the vehicle side member 15 and, by means of screws 25 (sheet metal screws) is fastened to the vehicle side member 15. The screws 25 are pushed from above through the through-openings of the vehicle side member 15 and of the contact flange 23 and are screwed into sheet metal nuts 26 which locally are fitted onto the contact flange 23 of the elbow 19 (FIG. 7). In the area where the elbow 19 is connected with the boundary wall 22, the latter has an upward-directed tube-shaped connecting piece 27. The connecting hose 9, which is also constructed in the manner of a corrugated tube, is fitted on this connecting piece 27 and is held in position by means of a pipe clamp which is not shown in detail. The connecting hose 9 extends between the connecting piece 27 and the heating and/or air-conditioning unit 6.

Figure 4:
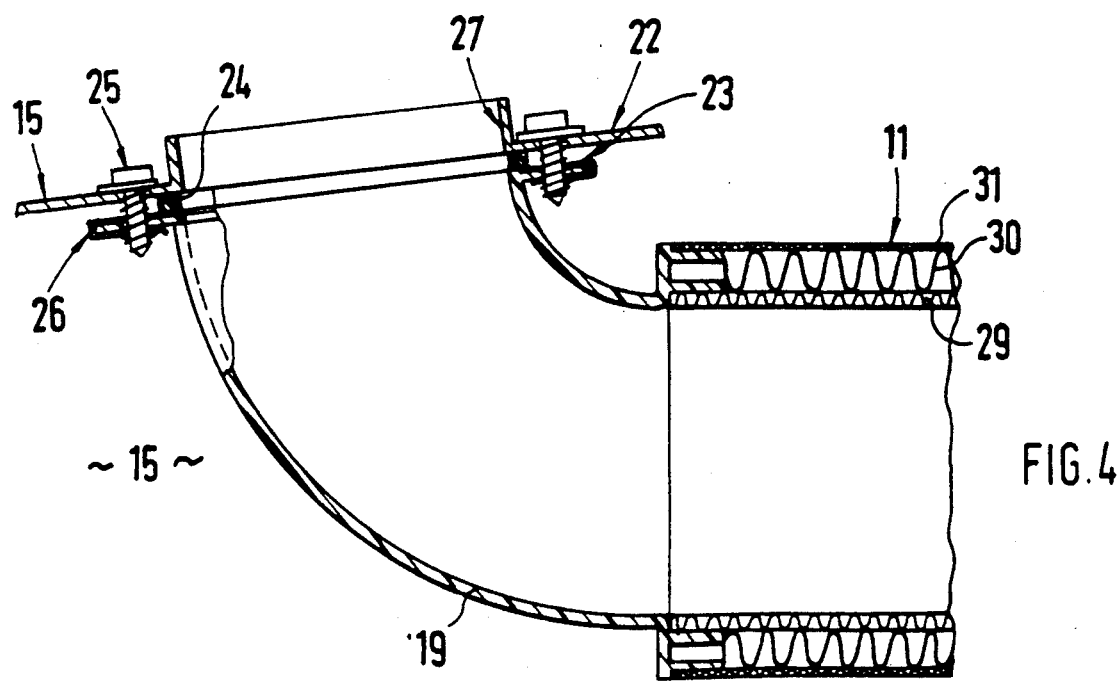
FIG. 4 is an enlarged partially sectional detail X of FIG. 1.

The sound absorbing device 11 and the corrugated-tube hose 20 are glued together at reference number 28. According to FIG. 4, the sound absorbing device 11, from the inside to the outside, consists of a perforated wound aluminum tube 29, a mineral-fiber absorption layer 30 and an outer paper-aluminum-paper tube 31. The corrugated-tube hose 20 is constructed as a three-layer aluminum-paper hose. The heating pipe 12 with the integrated sound absorbing device 11 is pulled through the mounting opening 21 in the front wheel house 16 by means of a steel cable—which is not shown in detail—through the vehicle side member 15. This is possible only because the heating pipe 12 together with the sound absorbing device 11 has a flexible construction.

Figure 5:
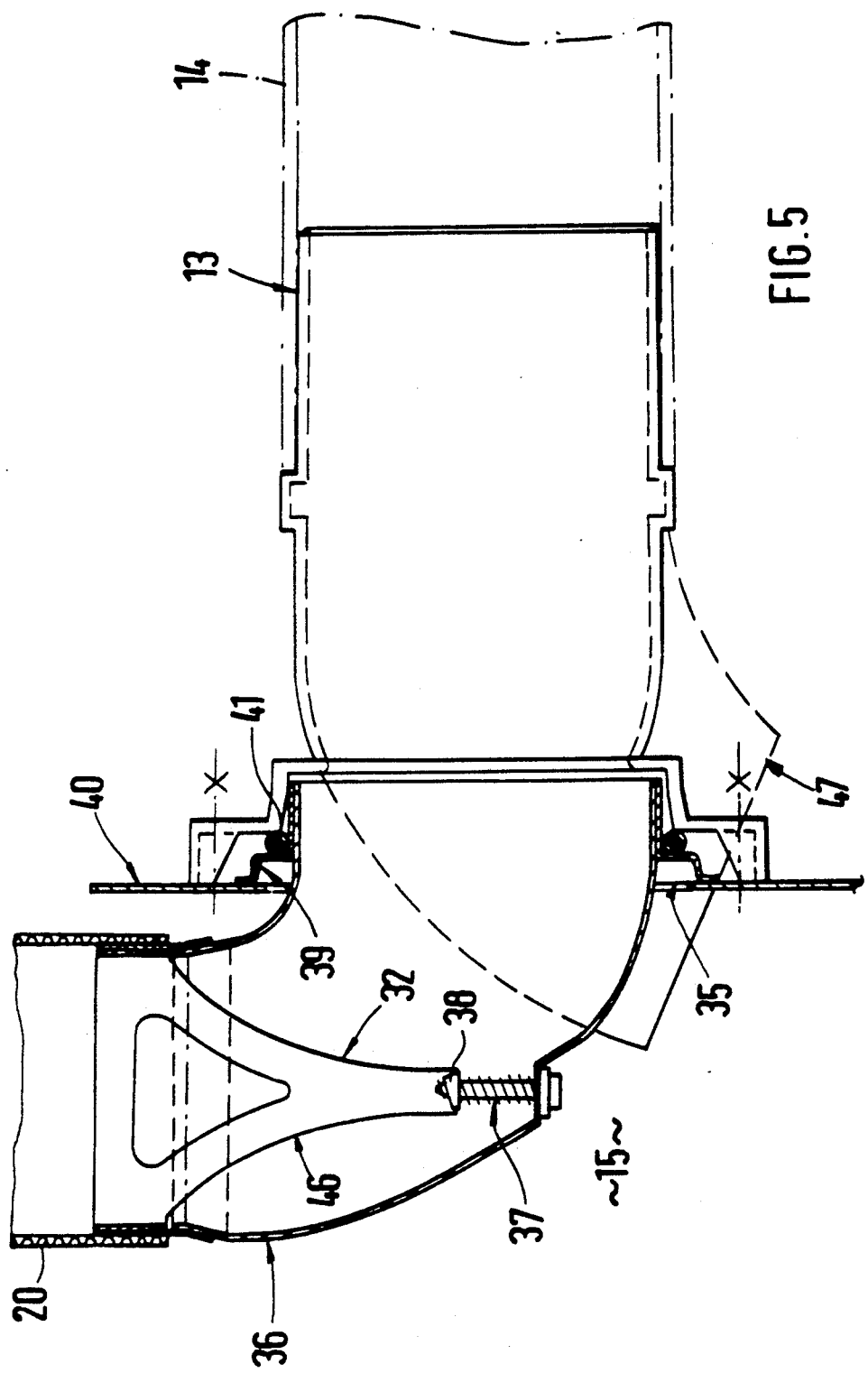
FIG. 5 is an enlarged view in the direction of arrow T of FIG. 2.

The steel cable is introduced into the vehicle side member 15 before the mounting and is releasably connected with a rear end piece 32 of the corrugated-tube hose 20. The corrugated-tube hose 20 and a ring-shaped section 34 of the end piece 32 which is connected with it by means of a rivet 33 have an oval shape (FIG. 8). According to FIG. 5, an approximately Y-shaped bow or hook 46 of the end piece 32 projects out of the corrugated-tube hose 20.

The corrugated-tube hose 20 is pulled so far through a lateral opening 35 of the vehicle side member 15 until the end piece 32 can be screwed together with a transition piece 36. The screw 37, which is inserted from the outside, is screwed into a sheet metal nut 38 of the end piece 32. Subsequently, the transition piece 36 with the corrugated-tube hose 20, in sections, is pushed back into the vehicle side member 15, specifically so far until a radial supporting ring 39 of the transition piece 36 supports itself from the outside on a vertical wall 40 of the vehicle side member 15. The supporting ring 39 surrounds the lateral opening 35 of the vehicle side member 15. Subsequently, the flap box 13, with the interposition of a sealing body 41, is pushed onto the transition piece 36 and is fastened to the vehicle side member 15. This takes place by means of screwing. The flap box 13 comprises a differential-pressure-controlled flap which is not shown in detail so that the heating air coming from the exhaust heat exchanger 8 either reaches the heating unit 6 toward the front through the heating line 7 or is deflected to the outside through a discharge opening 47 in the area of the rear wheel housing 17.

Figure 3:
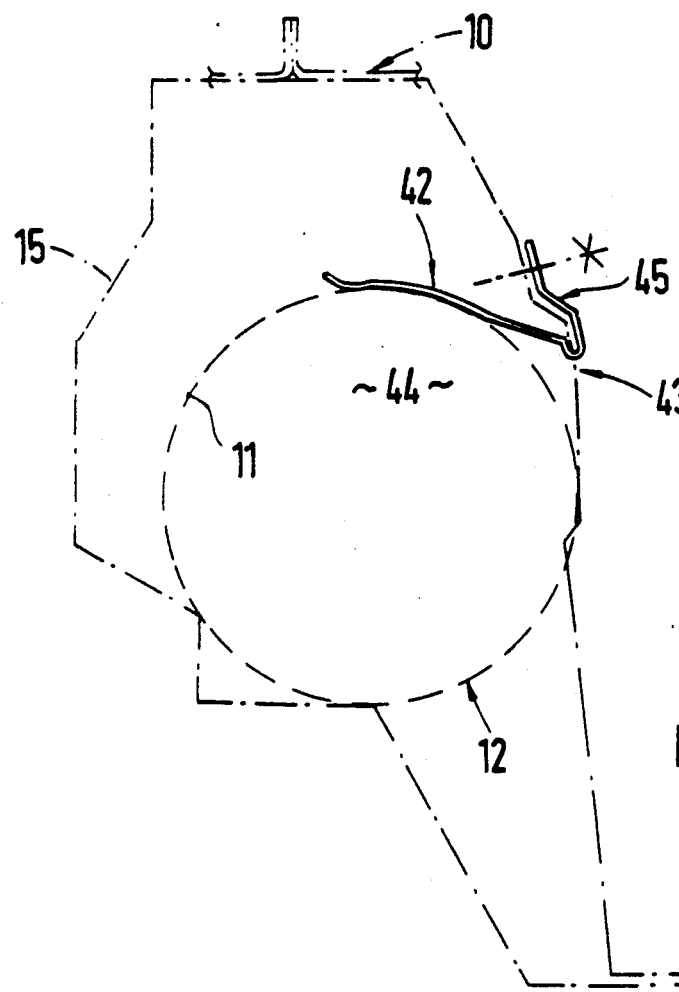
FIG. 3 is an enlarged sectional view taken along Line III—III of FIG. 1.

By means of the rear connecting pipe 14, the flap box 13 is connected to the exhaust heat exchanger 8. The rear connecting pipe 14 may be constructed to be either rigid or flexible. So that the position of the sound absorbing device 11 is secured in the vehicle side member 15, spring clips 42 are pushed in laterally through the vehicle side member 15 which, in sections, reach around the sound absorber 11. The spring clips 42, through slotted openings 43 of the vehicle side member 15, are in sections fitted into the interior support space 44. A section 45 of the spring clip 42 extending outside the vehicle side member 15 rests against the exterior side of the vehicle side member 15 and is fastened in the appropriate manner,—for example, by means of screws (FIG. 3). After the mounting of the heating pipe 12, the mounting opening 21 in the front wheel house 16 is closed off by means of a socket, which is not shown in detail, or by means of a covering.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of manufacturing a heating system for a motor vehicle with an air-cooled rear engine, comprising:
    forming a heating line with an integrated sound absorbing device as a prefabricated flexible mounting part,
    inserting said flexible mounting part into a vehicle body part through a mounting opening provided in a front wheel housing of the vehicle, after surface treatment of the vehicle, and
    subsequently connecting at least one end face of the flexible mounting part with adjacent components of the heating system and of the vehicle body.

2. A method according to claim 1, wherein said vehicle body part is a laterally exterior vehicle side member.

3. A method according to claim 1, wherein the flexible mounting part consists of a front elbow, the sound absorbing device constructed in the manner of a corrugated tube, and a rear corrugated-tube hose.

4. A method according to claim 3, wherein the front elbow consists of plastic and is glued together with the sound absorbing device.

5. A method according to claim 3, wherein an end-face contact flange of the front elbow, with the interposition of a sealing device, extends from below against an approximately horizontally aligned upper boundary wall of the vehicle side member and is screwed together with it.

6. A method according to claim 5, wherein at the upper boundary wall, in the area of the contact flange, an upwardly directed connecting piece is provided for the fastening of a connecting hose leading to the heating unit.

7. A method according to claim 1, wherein sound absorbing device is constructed as a corrugated tube which extends inside a laterally exterior vehicle side member, and wherein a rear free end of the corrugated tube has a projecting end piece, this end piece being connected with a rear transition piece outside the vehicle side member, and wherein subsequently the rear transition piece is pushed, in sections, into a support-side opening and is fixed by means of an adjacent flap box at the vehicle side member.

8. A method according to claim 7, wherein an approximately U-shaped bow of the end piece, which projects out of the corrugated-tube hose, is screwed together with a rear transition piece.

9. A method according to claim 7, wherein the transition piece, at its end facing the flap box, has a radial supporting ring which rests against the exterior side of the vertical wall of the vehicle side member adjacent to the opening.

10. A method according to claim 7, wherein the flap box, with the interposition of a sealing body, is placed on one end of the transition piece and is fastened to the vehicle side member.

11. A method according to claim 2, wherein for the fastening of the sound absorbing device, a spring clip is provided locally which is introduced through a slotted opening of the vehicle side member and surrounds the sound absorbing device in sections.

12. A method according to claim 2, wherein the prefabricated mounting part, by means of a steel cable, is pulled from the front toward the rear, through the vehicle side member, the steel cable being releasably suspended at a rear end piece.

* * * * *